United States Patent [19]

Sarabi et al.

[11] Patent Number: 6,140,426
[45] Date of Patent: Oct. 31, 2000

[54] GRAFT POLYMER MOULDING COMPOSITIONS WITH REDUCED DEPOSIT FORMATION

[75] Inventors: Bahman Sarabi, Krefeld; Herbert Eichenauer; Edgar Leitz, both of Dormagen; Heinrich Alberts, Odenthal; Thomas Eckel, Dormagen; Dieter Wittmann, Leverkusen, all of Germany

[73] Assignee: Bayer Aktiengesellschaft, Germany

[21] Appl. No.: 09/047,254

[22] Filed: Mar. 24, 1998

[30] Foreign Application Priority Data

Apr. 1, 1997 [GB] United Kingdom .............. 197 13 509

[51] Int. Cl.⁷ .......................... C08F 279/02; C08L 51/04
[52] U.S. Cl. .............. 525/316; 525/70; 525/71; 525/73
[58] Field of Search ................ 525/316, 71, 70, 525/73

[56] References Cited

U.S. PATENT DOCUMENTS

| | | | |
|---|---|---|---|
| 4,068,064 | 1/1978 | Platt et al. | 526/194 |
| 4,639,473 | 1/1987 | Wingler et al. | 525/83 |
| 5,975,936 | 8/1998 | Lin et al. | 525/71 |

FOREIGN PATENT DOCUMENTS

| | | |
|---|---|---|
| 0 456 030 A3 | 11/1991 | European Pat. Off. . |
| 0 731 138 A3 | 9/1996 | European Pat. Off. . |
| 279 891 | 6/1990 | Germany . |

OTHER PUBLICATIONS

K. Kirschner and H. Schlapkohl in Makromol. Chem. 177(1976), pp. 2031–2042.

W. Scholtan et al, Kolloid–Z.u.Z. Polymere 250(1972), 782–796.

Chemical Abstracts, vol. 126, No. 9, Mar. 3, 1997, Columbus, Ohio, US; abstract No. 118931, XP002070921 & JP 08 311 127 A (Japan Synthetic Rubber Co. Ltd) Nov. 26, 1996.

Chemical Abstracts, vol. 90, No. 18, Apr. 30, 1979, Columbus Ohio, US; abstract No. 138672, XP002070922 & JP 53 145 859 A (Toray Industries, Inc., Japan) Dec. 19, 1978.

*Primary Examiner*—James J. Seidleck
*Assistant Examiner*—Olga Asinovsky
*Attorney, Agent, or Firm*—Connolly Bove Lodge & Hutz

[57] ABSTRACT

The present invention relates to thermoplastic graft polymer moulding compositions for high-gloss applications, which exhibit a reduced tendency of the additives to exude out of the thermoplastic composition during processing, and which exhibit reduced deposit build-up in the mould.

5 Claims, 2 Drawing Sheets

GRAFT POLYMER MOULDING COMPOSITIONS WITH REDUCED DEPOSIT FORMATION

The present invention relates to thermoplastic graft polymer moulding compositions for high-gloss applications, which exhibit a reduced tendency of the additives to exude out of the thermoplastic composition during processing, and which exhibit reduced deposit build-up in the mould.

Graft polymer moulding compositions, particularly ABS moulding compositions, are two-phase plastics consisting of:

I. a thermoplastic copolymer of styrene and acrylonitrile in which the styrene can be completely or partially replaced by other monomers, such as α-methylstyrene or methyl methacrylate for example; this copolymer, which is also termed an SAN resin or matrix resin, forms the external phase;

II. at least one graft polymer of the ABS type, which has been produced by a grafting reaction of one or more of the monomers cited in I. on to a butadiene homo- or copolymer (the "graft base"). This graft polymer (the "elastomer phase" or "graft rubber") forms the disperse phase in the matrix resin.

One important point relating to the production of high-gloss mouldings from these moulding compositions is the increasing requirement of the market for freedom from deposits in the mould (e.g. the possibility of fully-automatic plastics processing to form mouldings by injection moulding), as well as the reliable prevention, which is necessary for high-gloss applications, of stains on the mouldings due to the emergence of liquid or low-viscosity constituents. Similarly, no deposits must adhere to the grain of grained moulds, which would thus result in an unsatisfactory transfer to the mouldings. On the other hand, ABS moulding compositions must exhibit the optimum properties, particularly as regards their thermoplastic processability and viscosity, which can often only be ensured by the addition of special additives, which in many cases are liquids.

The object was therefore to provide graft polymer moulding compositions, preferably ABS moulding compositions, for the high-gloss range, which have very good process technology properties, without the Occurrence of deposit formation during thermoplastic processing.

It has now been found that the requirements described above are fulfilled if the moulding compositions are synthesised from specially made-up components and if certain compatibility conditions are complied with.

The present invention relates to thermoplastic moulding compositions of the ABS type, containing A) 5 to 95% by weight, preferably 10 to 90% by weight, and most preferably 20 to 75% by weight, of at least one thermoplastic homo-, co- or terpolymer of styrene, α-methylstyrene, acrylonitrile, N-substituted maleinimide or mixtures thereof, B) 5 to 95% by weight, preferably 10 to 90% by weight, and most preferably 25 to 80% by weight, of at least one graft polymer of B.1) 5 to 90 parts by weight, preferably 30 to 80 parts by weight, of styrene, α-methylstyrene, acrylonitrile, N-substituted maleinimide or mixtures thereof, on B.2) 95 to 10 parts by weight, preferably 70 to 20 parts by weight, of a rubber with a glass transition temperature $\leq 0°$ C., and C) 1 to 10 parts by weight, preferably 2 to 7.5 parts by weight, and most preferably 3 to 5 parts by weight (per 100 parts by weight of A+B in each case), of at least one additive selected from the group comprising internal lubricants, anti-static agents, demoulding agents or mixtures thereof, characterised in that component A) is produced by bulk solution or suspension polymerisation and has an oligomer content $\leq 1\%$ by weight, preferably $\leq 0.75\%$ by weight, and most preferably $\leq 0.5\%$ by weight, component B) is synthesised by emulsion polymerisation, and the total oligomer content (dimers, trimers, tetramers) of the moulding composition is $\leq 0.8\%$ by weight, preferably $\leq 0.7\%$ by weight, and most preferably $\leq 0.6\%$ by weight, and the ratio of the molecular weight of the additive to the amount of additive in the moulding composition (in % by weight) does not fall below a value of 150, preferably 200 and most preferably 250.

Polymers A) which are suitable according to the invention are resin-like, thermoplastic, rubber-free products of styrene, α-methylstyrene, acrylonitrile, N-substituted maleinimide or mixtures thereof with an oligomer content of $\leq 1\%$ by weight, preferably $\leq 0.75\%$ by weight, and most preferably $\leq 0.5\%$ by weight, which are produced by bulk, solution or suspension polymerisation and not by emulsion polymerisation.

The preferred polymers are those produced from styrene/acrylonitrile mixtures, α-methylstyrene/acrylonitrile mixtures, styrene/α-methylstyrene/acrylonitrile mixtures, styrene/N-phenylmaleinimide mixtures, and styrene/acrylonitrile/N-phenylmaleinimide mixtures.

Styrene/acrylonitrile copolymers and α-methylstyrene/acrylonitrile copolymers are the polymers which are particularly preferred.

Polymer resins of this type are known. These resins have to be produced so that the required oligomer content is not exceeded. In the thermal solution or bulk polymerisation methods which are the most frequently used industrially, oligomers are preferentially formed from 2 to 4 monomer units (in this respect, see K. Kirchner and H. Schlapkohl in Makromol. Chem. 177 (1976), pages 2031–2042: The Formation of Oligomers in the Thermal Copolymerisation of the Styrene/Acrylonitrile System). In order to prevent oligomer formation such as this, special reaction conditions have to be employed, comprising the use of certain initiators, such as di-tert.-butyl peroxide, 1,1 -bis(t-butylperoxy)cyclohexane, benzoyl peroxide or azo-bis-isobutyronitrile, for example. Processes such as these are known (see U.S. Pat. No. 4,068,064, for example).

Accordingly, polymers A) which are suitable according to the invention are preferably produced by bulk, solution or suspension polymerisation, using organic radical initiators and maintaining other reaction conditions which may possibly be necessary to attain low contents of oligomers, such as those described in U.S. Pat. No. 4,068,064, for example.

In principle, a further method of producing polymers A) which are suitable according to the invention consists of bringing oligomer-containing resins to the required oligomer content by degassing steps (e.g. in the melt); this method is relatively costly, however.

The oligomers can be measured by customary methods; they are most commonly determined by gas chromatography or by gel permeation chromatography.

Resin components A) preferably have average molecular weights $\overline{M}_w$ of 20,000 to 200,000, or limiting viscosities $[\eta]$ of 20 to 110 ml/g (measured in dimethylformamide at 25° C.).

Rubbers which are particularly suitable for producing graft polymers B) are polybutadiene, butadiene/styrene copolymers, butadiene/acrylonitrile copolymers, polyisoprene, or alkyl acrylate rubbers based on $C_1$–$C_8$ alkyl acrylates, particularly ethyl, butyl and ethylhexyl acrylate.

The alkyl acrylate rubbers may optionally contain up to 30% by weight (with respect to the weight of rubber) of monomers which are incorporated by copolymerisation, such as vinyl acetate, acrylonitrile, styrene, methyl methacrylate and/or vinyl ethers. They may also contain smaller amounts, Preferably up to 5% by weight (with respect to the weight of rubber) of ethylenically unsaturated monomers which have a crosslinking effect and which are incorporated by polymerisation. Examples of crosslinking agents include alkylene diol diacrylates, allylene diol dimethacrylates, polyester diacrylates and polyester dimethacrylates, divinylbenzene, trivinylbenzene, triallyl cyanurate, allyl acrylate and allyl methacrylate, butadiene or isoprene.

Acrylate rubbers which are used as a graft base may also contain, as their nucleus, a crosslinking diene rubber produced from one or more conjugated dienes, such as polybutadiene, or a copolymer of a conjugated diene with an ethylenically unsaturated monomer such as styrene and/or acrylonitrile.

The preferred rubbers for producing graft polymers B) are diene and alkyl acrylate rubbers. Polybutadiene, and copolymers of butadiene and styrene and of butadiene and acrylonitrile, are particularly preferred.

The rubbers are present in graft polymer B) in the form of at least partially crosslinked particles with an average particle diameter ($d_{50}$) of 0.05 to 0.60 µm, preferably 0.08 to 0.50 µm, and most preferably 0.1 to 0.45 µm.

The average particle diameter $d_{50}$ is determined by ultracentrifuge measurements, according to W. Scholtan et al., Kolloid-Z. u. Z. Polymere 250 (1972), 782–796.

Graft polymers B) are produced by radical-induced emulsion graft polymerisation of monomers B.1) in the presence of the rubbers B.2) to be grafted, which are present in the form of an emulsion.

Suitable additives C) which are used according to the invention comprise internal lubricants, anti-static agents and demoulding agents; these additives play an important part in the attainment of good surface qualities. In this respect, these additives are used in amounts of 1 to 10 parts by weight, preferably 2 to 7.5 parts by weight, and most preferably 3 to 5 parts by weight (with respect to 100 parts by weight A+B in each case).

Examples of internal lubricants include hydrocarbons (e.g. paraffin oils, polyethylene waxes), alcohols (e.g. stearyl alcohol), carboxylic acids (e.g. lauric acid, palmitic acid, stearic acid), carboxylic acid amides (stearic acid amide, ethylenediamine-bis-stearylamide), carboxylic acid esters (e.g. n-butyl stearate, stearyl stearate, glycerol monostearate, glycerol tristearate, pentaerythritol tetrastearate); the preferred internal lubricants are carboxylic acid amides and carboxylic acid esters.

Examples of anti-static agents comprise cation-active compounds (e.g. quaternary ammonium, phosphonium or sulphonium salts), anion-active compounds (e.g. alkyl sulphonates, alkyl sulphates, alkyl phosphates, carboxylates in the form of salts of alkali metals or alkaline earth metals), non-ionogenic compounds (e.g. polyethylene glycol esters, polyethylene glycol ethers, esters of fatty acids, ethoxylated fatty amines); the preferred anti-static agents are non-ionogenic compounds.

Examples of demoulding agents include calcium stearate, zinc stearate and magnesium stearate; the preferred demoulding agent is magnesium stearate.

In this connection, in order to ensure a satisfactory decrease in deposit formation, the ratio of the (molecular weight of the additive added): (amount of added additive in the moulding composition in % by weight) should not fall below a value of 150, preferably 200, and most preferably 250.

Apart from the cited additives, the moulding compositions according to the invention may also contain stabilisers, pigments and fillers.

The mixtures according to the invention are prepared by mixing the constituents, in the known manner, simultaneously or successively at room temperature or at elevated temperature, and thereafter compounding or extruding them in the melt at temperatures of 150° C. to 300° C. in customary processing units such as internal kneaders, extruders, or double-shaft screw-type devices.

The moulding compositions of the invention can be used for the production of mouldings of any type, wherein customary production methods can be used. In particular, mouldings can be produced by injection moulding techniques.

Another method of processing the moulding compositions according to the invention is the production of mouldings by thermoforming from slabs or sheets produced previously by known methods.

EXAMPLES

Components Used

A1: styrene/acrylontrile=a 72:28 copolymer with an average molecular weight $\overline{M}_w$ of 88,000, produced by suspension polymerisation with di-tert.-butyl peroxide at 140° C. Oligomer content: 0.35% by weight.

A2: styrene/acrylonitrile=a 72:28 copolymer with an average molecular weight $\overline{M}_w$ of 81,000, produced by periodic bulk polymerisation with di-tert.-butyl peroxide at 150° C. Oligomer content: 0.60% by weight.

AV (comparative material): styrene/acrylonitrile=a 72:28 copolymer with an average molecular weight $\overline{M}_w$ of 85,000, produced by thermal bulk polymerisation at 165° C. Oligomer content: 1.83% by weight.

B1: a graft polymer obtained by the potassium persulphate-initiated emulsion polymerisation of 45 parts by weight of a monomer mixture of styrene and acrylonitrile (ratio by weight=73:27) in the presence of 55 parts by weight (calculated as the solid) of a polybutadiene latex with an average particle size ($d_{50}$) of about 400 nm, coagulation with a magnesium sulphate/acetic acid mixture and drying the polymer powder, B2: a graft polymer obtained by the potassium persulphate-initiated emulsion polymerisation of 45 parts by weight of a monomer mixture of styrene and acrylonitrile (ratio by weight=73:27) in the presence of 55 parts by weight (calculated as the solid) of a polybutadiene latex with an average particle size ($d_{50}$) of about 130 nm, coagulation with a magnesium sulphate/acetic acid mixture and drying the polymer powder.

C1: ethylenediamine-bis-stearylamide (Henkel KG, Düsseldorf Germany)

C2: n-butyl stearate (Merck AG, Darmstadt, Germany)

C3: magnesium stearate (Bärlocher, Munich, Germany).

The components described above were homogeneously mixed, in the amounts given in Table 1, at about 190° C. to 200° C. in an internal kneader, and were subsequently converted into the form of granules.

Figure 1:
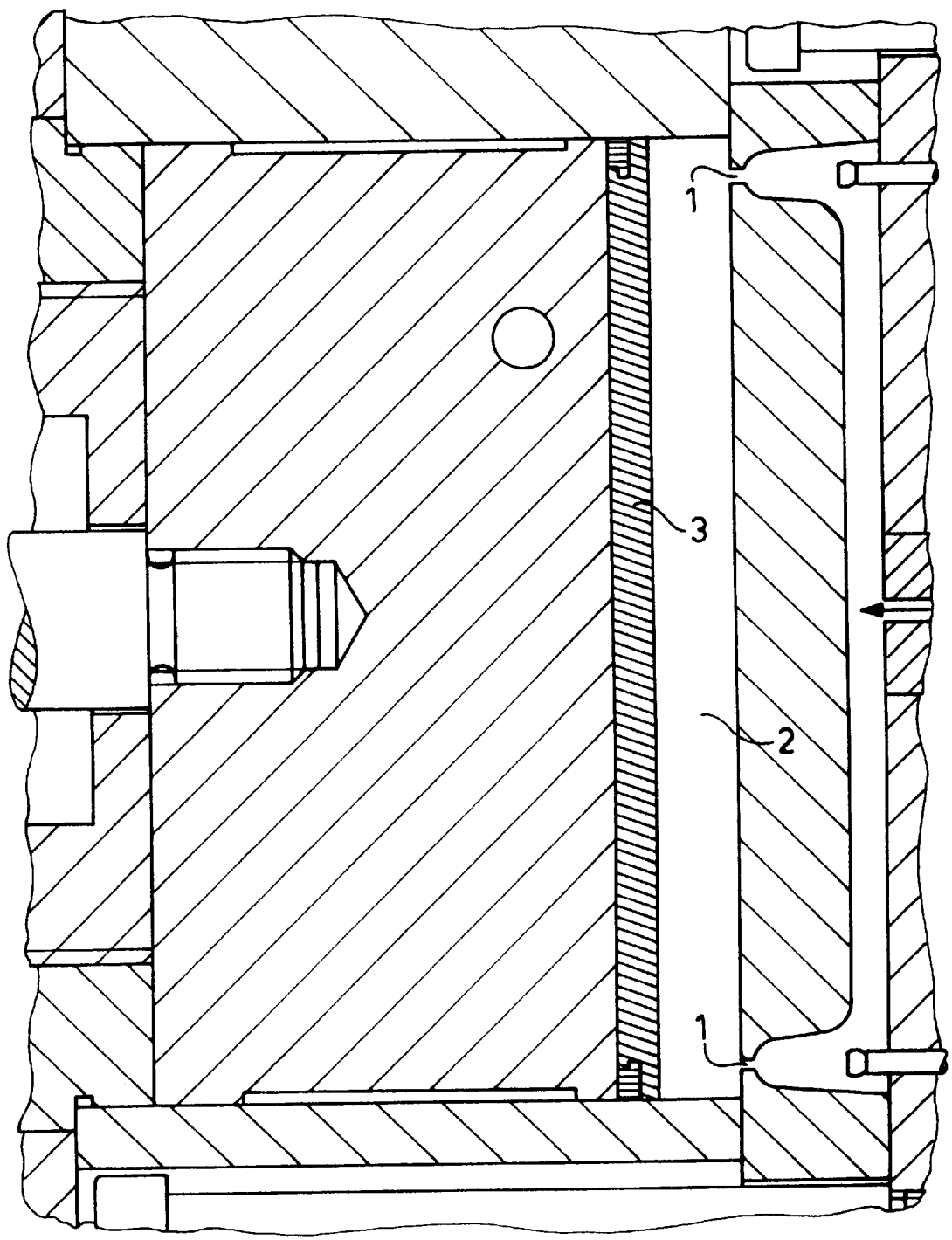
FIG. 1 is a cross-sectional view of a hot runner mould.

This material was processed under the conditions given below, using a hot runner mould as illustrated in FIG. 1.

After 350 injection operations, the disc was removed and the amount of deposit was determined (see Table 1, last column).

It can be seen from the results that only the moulding compositions according to the invention resulted in a very slight deposit formation.

Processing Conditions

| | | |
|---|---|---|
| Injection moulding machine: | Klöckner-Ferromatik-FM60, fully controlled worm diameter: | 25 mm |
| | mould clamping force: | 600 kN |
| | max. charge weight: | 45 g |
| | max. injection moulding pressure: | 3000 bar |
| Mould: | round disc, diameter 118 mm, thickness 2 to 4 mm, preferably 2 mm, with hot runner (FIG. 1), 6 interchangeable terminating discs, double pin-point gate (each of diameter 0.1 to 2 mm, preferably each of 0.8 mm diameter), with merging seam and air ejector, wall thickness 1.5 mm (variable), charge weight 20 g (disc 15 g, sprue 5 g) | |
| Injection moulding parameters: | material temperature: | 240° C. |
| | mould temperature: | 28° C. |
| | worm advance rate: | 100 mm/s |
| | injection moulding time: | 0.5 s |
| | average dwell time: | 143 s |
| | total cycle: | 35.5 s |
| | (pressure dwell time 12 s, cooling time 18 s, pause time 1 s). | |

Figure 2:
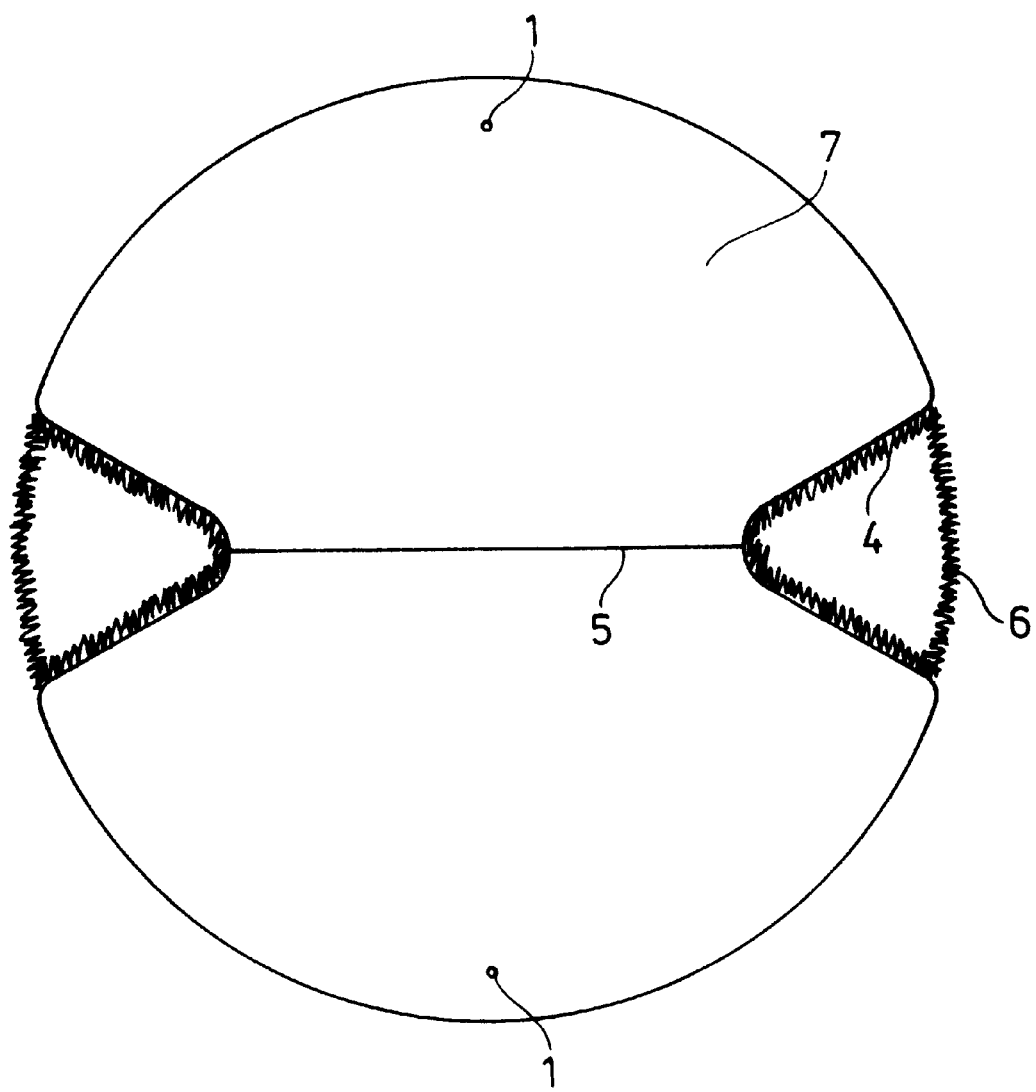
FIG. 2 is a view of a disc produced by the mould of FIG. 1.

A special mould was used for measuring the deposits formed in the mould when these ABS moulding compositions were injection moulded (FIG. 1). A round disc 7 (118 mm o.d., thickness 2 mm) was produced in this mould by injection moulding, via two gates 1 (diameter 0.8 mm), in accordance with the given processing conditions. When the hot material (240° C.) flowed into the cavity 2, deposits 4 of the volatile constituents were formed on the circular flow lines which meet in the middle of the cavity. After these flow lines had come into contact, the injection moulding operation was stopped, so that an area 6 approximating to a triangle remained for the assessment of the deposit (FIG. 2). This procedure corresponded to 80% of the total metering distance. The amounts of deposit were measured by removing the interchangeable terminating disc 3 from the mould after 350 injection moulding operations in each case and determining its total weight (FIG. 2). Additional checks of the weight were made by removing the deposit with a razor blade.

What is claimed is:

1. Thermoplastic moulding compositions of the ABS type, consisting essentially of
   A) 5 to 95% by weight of at least one thermoplastic homo-, co- or terpolymer of styrene, α-methylstyrene, acrylonitrile, N-substituted maleinimide or mixtures thereof,
   B) 5 to 95% by weight of at least one graft polymer of
      B.1) 5 to 90 parts by weight of styrene, α-methylstyrene, acrylonitrile, N-substituted maleinimide or mixtures thereof, on
      B.2) 95 to 10 parts by weight of a rubber with a glass transition temperature $\leq 0°$ C., and
   C) 1 to 10 parts by weight (per 100 parts by weight of A+B), of at least one additive selected from the group consisting of internal lubricants, anti-static agents, demoulding agents or mixtures thereof, characterised in that component A) is produced by bulk, solution or suspension polymerisation and has an oligomer content $\leq 1\%$ by weight, component B) is produced by emulsion polymerisation, the total oligomer content of the moulding compositions is $\leq 0.8\%$ by weight, and the ratio of the molecular weight of the additive to the amount of additive in the moulding composition (in % by weight) does not fall below a value of 150.

2. Thermoplastic moulding compositions of the ABS type according to claim 1, consisting essentially of
   A) 10 to 90% by weight of at least one thermoplastic homo-, co- or terpolymer of styrene, α-methylstyrene, acrylonitrile, N-substituted maleinimide or mixtures thereof,
   B) 10 to 90% by weight of at least one graft polymer of
      B.1) 30 to 80 parts by weight of styrene, α-methylstyrene, acrylonitrile, N-substituted maleinimide or mixtures thereof, on
      B.2) 70 to 20 parts by weight of a rubber with a glass transition temperature $\leq 0°$ C., and
   C) 2 to 7.5 parts by weight (per 100 parts by weight of A+B), of at least one additive selected from the group consisting of internal lubricants, anti-static agents, demoulding agents or mixtures thereof, characterised in that component A) is produced by bulk, solution or suspension polymerisation and has an oligomer content $\leq 0.75\%$ by weight, component B) is produced by emulsion polymerisation, the total oligomer content of the moulding compositions is $\leq 0.7\%$ by weight, and the ratio of the molecular weight of the additive to the amount of additive in the moulding composition (in % by weight) does not fall below a value of 200.

3. Thermoplastic moulding compositions according to claim 1, characterised in that styrene/acrylonitrile copoly-

TABLE 1

Compositions of moulding compositions and resulting deposit formation (data in parts by weight)

| Example | A1 (SAN) | A2 (SAN) | AV (SAN) | B1 (graft polymer) | B2 (graft polymer) | C1 (additive) | C2 (additive) | C3 (additive) | Amount of deposit (mg) |
|---|---|---|---|---|---|---|---|---|---|
| 1 | 70 | — | — | 15 | 15 | 3.5 | — | — | 6 |
| 2 | — | 70 | — | 15 | 15 | 3.5 | — | — | 8 |
| 3 (comparative) | — | — | 70 | 15 | 15 | 3.5 | — | — | 28 |
| 4 (comparative) | 70 | — | — | 15 | 15 | — | 3.5 | — | 16 |
| 5 (comparative) | 70 | — | — | 15 | 15 | 5 | — | — | 15 |
| 6 | 65 | — | — | 35 | — | 3.3 | — | 0.5 | 6 |
| 7 (comparative) | — | — | 65 | 35 | — | 3.3 | — | 0.5 | 31 | mers and/or α-methylstyrene/acrylonitrile copolymers are used as thermoplastic resin component A).

4. The thermoplastic moulding compositions according to claim 1 having the form of a moulding.

5. The thermoplastic moulding compositions according to claim 1 having the form of high-gloss mouldings.

* * * * *